United States Patent
Liu et al.

(10) Patent No.: US 11,211,811 B2
(45) Date of Patent: Dec. 28, 2021

(54) THREE-PORT CHARGER WITH INVERSION FUNCTION

(71) Applicant: SHENZHEN VMAX NEW ENERGY CO.,LTD., Guangdong (CN)

(72) Inventors: Jun Liu, Guangdong (CN); Yingying Feng, Guangdong (CN); Shun Yao, Guangdong (CN); Jinzhu Xu, Guangdong (CN)

(73) Assignee: SHENZHEN VMAX NEW ENERGY CO., LTD., Shenzhen (CN)

( * ) Notice: Subject to any disclaimer, the term of this patent is extended or adjusted under 35 U.S.C. 154(b) by 157 days.

(21) Appl. No.: 16/775,377

(22) Filed: Jan. 29, 2020

(65) Prior Publication Data
US 2020/0195018 A1     Jun. 18, 2020

Related U.S. Application Data

(63) Continuation of application No. PCT/CN2018/083748, filed on Apr. 19, 2018.

(30) Foreign Application Priority Data

Sep. 30, 2017   (CN) .......................... 201710917389.X (51) Int. Cl.
*H02J 7/00*    (2006.01)
*H02M 3/335*   (2006.01)
(Continued)

(52) U.S. Cl.
CPC .......... *H02J 7/007* (2013.01); *H02M 3/33584* (2013.01); *B60L 1/00* (2013.01);
(Continued)

(58) Field of Classification Search
CPC ....... H02J 7/007; H02J 2207/20; B60L 53/22; B60L 53/53; B60L 1/00; B60L 2210/10;
(Continued)

(56) References Cited

U.S. PATENT DOCUMENTS

| 2008/0101096 | A1  | 5/2008  | Takayanagi et al. |
| 2016/0016479 | A1* | 1/2016  | Khaligh ................. H01F 38/08 363/17 |
| 2017/0366099 | A1* | 12/2017 | Li ......................... H02M 3/285 |

FOREIGN PATENT DOCUMENTS

| CN | 103746419 A | 4/2014 |
| CN | 106936184 A | 7/2017 |
| CN | 107623365 A | 1/2018 |

OTHER PUBLICATIONS

"Topology and Control Scheme of OBC-LDC Integrated Power Unit for Electric Vehicles", Yun-Sung Kim, Won-Yong Sung, IEEE Mar. 2017.*

(Continued)

*Primary Examiner* — Nha T Nguyen
(74) *Attorney, Agent, or Firm* — Locke Lord LLP; Tim Tingkang Xia, Esq.

(57) ABSTRACT

A three-port charger with an inversion function includes a primary side conversion circuit connected with a primary side winding of a transformer, a secondary side first conversion circuit connected with a second winding of the transformer, a secondary side second conversion circuit connected with a third winding of the transformer and a fourth winding of the transformer which are connected in series, and a central control unit used for controlling switches in the primary side conversion circuit, the secondary side first conversion circuit and the secondary side second conversion circuit. The primary side conversion circuit is connected with an external power supply, the secondary side first conversion circuit is connected with a high-voltage battery. The secondary side second conversion circuit is connected with a low-voltage load. The present invention integrates the independent charger and a high-power DCDC module, and shares a power switch, a control circuit and a magnetic core.

9 Claims, 6 Drawing Sheets

(51) Int. Cl.
   *B60L 53/22*    (2019.01)
   *B60L 53/53*    (2019.01)
   *B60L 1/00*     (2006.01)
   *B60R 16/033*   (2006.01)

(52) U.S. Cl.
   CPC .............. *B60L 53/22* (2019.02); *B60L 53/53* (2019.02); *B60L 2210/10* (2013.01); *B60L 2210/44* (2013.01); *B60R 16/033* (2013.01); *H02J 2207/20* (2020.01)

(58) Field of Classification Search
   CPC ............. B60L 2210/44; B60L 2210/12; B60L 2210/14; B60R 16/033; Y02T 10/72; Y02T 90/14; Y02T 10/7072; Y02T 10/92; Y02T 10/70; H02M 7/797; H02M 3/33584; H02M 1/008; H02M 1/0058
   See application file for complete search history.

(56) References Cited

OTHER PUBLICATIONS

International Search Report, PCT/CN2018/083748, dated Jul. 13, 2018.

\* cited by examiner

THREE-PORT CHARGER WITH INVERSION FUNCTION

CROSS-REFERENCE TO RELATED PATENT APPLICATION

This application is a continuation application of International Patent Application No. PCT/CN2018/083748, filed on Apr. 19, 2018, which itself claims priority to Chinese Patent Application No. CN201710917389.X filed in China on Sep. 30, 2017. The disclosures of the above applications are incorporated herein in their entireties by reference.

FIELD

The present invention relates to charging equipment, and more particularly, to a three-port charger with an inversion function.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

With improved requirements on energy conservation, emission reduction and air pollution control, a new energy vehicle is gradually being commercialized in the market, and an electric vehicle is a main force of the new energy vehicle. The electric vehicle is divided into a pure electric vehicle and a hybrid vehicle, wherein an on-board charger and a high-power DCDC are important components of the electric vehicle. However, in the related art, the on-board charger and the DCDC module are separated and independent, and even if they are integrated, they also belong to physical assembly integration, which has defects of a large assembly space, a low conversion efficiency and high costs.

SUMMARY

In order to solve the defects in the related art above, the present invention provides a three-port charger with an inversion function.

The technical solution provided by the present invention is to design a three-port charger with an inversion function, which includes a primary side conversion circuit connected with a primary side winding of a transformer, a secondary side first conversion circuit connected with a second winding of the transformer, a secondary side second conversion circuit connected with a third winding of the transformer and a fourth winding of the transformer which are connected in series, and a central control unit used for controlling switches in the primary side conversion circuit, the secondary side first conversion circuit and the secondary side second conversion circuit, wherein the primary side conversion circuit is connected with an external power supply, the secondary side first conversion circuit is connected with a high-voltage battery, and the secondary side second conversion circuit is connected with a low-voltage load.

The central control unit is provided with a charging mode, a self-powered mode and an inversion mode; in the charging mode, an on-off frequency of the switch in the primary side conversion circuit is controlled and a voltage of the primary side winding of the transformer is adjusted, the switch in the secondary side first conversion circuit is controlled to work in a rectification mode and charge the high-voltage battery, and the switch in the secondary side second conversion circuit is controlled to work in a chopping mode, adjust constant voltage output of the secondary side second conversion circuit and supply power to the low-voltage load; in the self-powered mode, the switch in the primary side conversion circuit is controlled to be turned off, an on-off duty ratio of the switch in the secondary side first conversion circuit is controlled and a voltage of the second winding of the transformer is adjusted, and the switch in the secondary side second conversion circuit is controlled to work in a rectification mode and supply power to the low-voltage load; and in the inversion mode, an on-off frequency of the switch in the secondary side first conversion circuit is controlled and a direct current of the high-voltage battery is inverted into an alternating current, the switch in the primary side conversion circuit is controlled to work in a rectification mode and feed power back to the external power supply, and the switch in the secondary side second conversion circuit is controlled to work in a chopping mode, adjust constant voltage output of the secondary side second conversion circuit and supply power to the low-voltage load.

The primary side conversion circuit includes first to fourth switches, a first capacitor and a first inductor, the first and third switches are sequentially connected in series through source and drain electrodes and then connected with the external power supply, the second and fourth switches are sequentially connected in series through source and drain electrodes and then connected with the external power supply, and the first capacitor, the first inductor and the primary side winding of the transformer are connected in series between a connecting line of the first and third switches and a connecting line of the second and fourth switches; and gate electrodes of the first to fourth switches are respectively connected with the central control unit.

The secondary side first conversion circuit may include fifth to eighth switches, a fourth capacitor and a second capacitor, the fifth and seventh switches are sequentially connected in series through source and drain electrodes and then connected with two ends of the second capacitor, the sixth and eighth switches are sequentially connected in series through source and drain electrodes and then connected with the two ends of the second capacitor, the two ends of the second capacitor are connected with the high-voltage battery, and the fourth capacitor and the second winding of the transformer are connected in series between a connecting line of the fifth and seventh switches and a connecting line of the sixth and eighth switches; and gate electrodes of the fifth to eighth switches are respectively connected with the central control unit.

The secondary side first conversion circuit may also include fifth to eighth switches, a current transformer and a second capacitor, the fifth and seventh switches are sequentially connected in series through source and drain electrodes and then connected with two ends of the second capacitor, the sixth and eighth switches are sequentially connected in series through source and drain electrodes and then connected with the two ends of the second capacitor, the two ends of the second capacitor are connected with the high-voltage battery, and the current transformer and the second winding of the transformer are connected in series between a connecting line of the fifth and seventh switches and a connecting line of the sixth and eighth switches; and gate electrodes of the fifth to eighth switches are respectively connected with the central control unit.

In one embodiment, the secondary side second conversion circuit includes first and second bidirectional switches, a fly-wheel diode, a second inductor and a third capacitor, one end of the first bidirectional switch is connected with a dotted terminal of the third winding of the transformer and the other end of the first bidirectional switch is connected with an anode of the fly-wheel diode and one end of the third capacitor, one end of the second bidirectional switch is connected with an undotted end of the fourth winding of the transformer and the other end of the second bidirectional switch is connected with the anode of the fly-wheel diode, an undotted end of the third winding of the transformer is connected with a dotted end of the fourth winding of the transformer and is connected with a cathode of the fly-wheel diode and one end of the second inductor, the other end of the second inductor is connected with the other end of the third capacitor, two ends of the third capacitor are connected with the low-voltage load, and the first and second bidirectional switches are controlled by the central control unit.

In the charging mode, on-off actions of the first and fourth switches are synchronized, on-off actions of the second and third switches are synchronized and the second and third switches are alternately turned on and off with the first and fourth switches, the second bidirectional switch is turned on at a right time during a turn-on period of the first and fourth switches and the first bidirectional switch is turned off, and the first bidirectional switch is turned on at a right time during a turn-on period of the second and third switches and the second bidirectional switch is turned off.

In the self-powered mode, on-off actions of the fifth and eighth switches are synchronized, on-off actions of the sixth and seventh switches are synchronized and the sixth and seventh switches are alternately turned on and off with the fifth and eighth switches, the second bidirectional switch is turned on at a right time during a turn-on period of the fifth and eighth switches and the first bidirectional switch is turned off, and the first bidirectional switch is turned on at a right time during a turn-on period of the sixth and seventh switches and the second bidirectional switch is turned off.

In the second embodiment, the secondary side second conversion circuit includes ninth to eleventh switches, a fly-wheel diode, a second inductor and a third capacitor, one end of the ninth switch is connected with a dotted terminal of the third winding of the transformer and the other end of the ninth switch is connected with an anode of the fly-wheel diode and one end of the third capacitor, one end of the tenth switch is connected with an undotted end of the fourth winding of the transformer and the other end of the tenth switch is connected with the anode of the fly-wheel diode, an undotted end of the third winding of the transformer is connected with a dotted end of the fourth winding of the transformer and is connected with one end of the eleventh switch, one end of the eleventh switch is connected with a cathode of the fly-wheel diode and one end of the second inductor, the other end of the second inductor is connected with the other end of the third capacitor, two ends of the third capacitor are connected with the low-voltage load, and the ninth to eleventh switches are controlled by the central control unit.

In the third embodiment, the secondary side second conversion circuit includes ninth to eleventh switches, a fly-wheel diode, a second inductor and a third capacitor, one end of the ninth switch is connected with a dotted terminal of the third winding of the transformer and the other end of the ninth switch is connected with one ends of the tenth switch and the eleventh switch, the other end of the tenth switch is connected with an undotted end of the fourth winding of the transformer, the other end of the eleventh switch is connected with the anode of the fly-wheel diode and one end of the third capacitor, an undotted end of the third winding of the transformer is connected with a dotted end of the fourth winding of the transformer and is connected with a cathode of the fly-wheel diode and one end of the second inductor, the other end of the second inductor is connected with the other end of the third capacitor, two ends of the third capacitor are connected with the low-voltage load, and the ninth to eleventh switches are controlled by the central control unit.

Compared with the related art, the present invention integrates an independent charger and a high-power DCDC module, has an inversion function, shares a power switch, a control circuit and a magnetic core, can flexibly realize control and switching of the charging mode, the self-powered mode and the inversion mode, has a simple and ingenious circuit design, a small volume, a light weight and low costs, and can be widely used in an on-board charger.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

To make the objectives, technical solutions, and advantages of the present invention clearer, the present invention is further described in detail hereinafter with reference to the accompanying drawings and embodiments. It should be understood that the specific embodiments described here are only used to explain the present invention, and are not used to limit the present invention.

Figure 1:
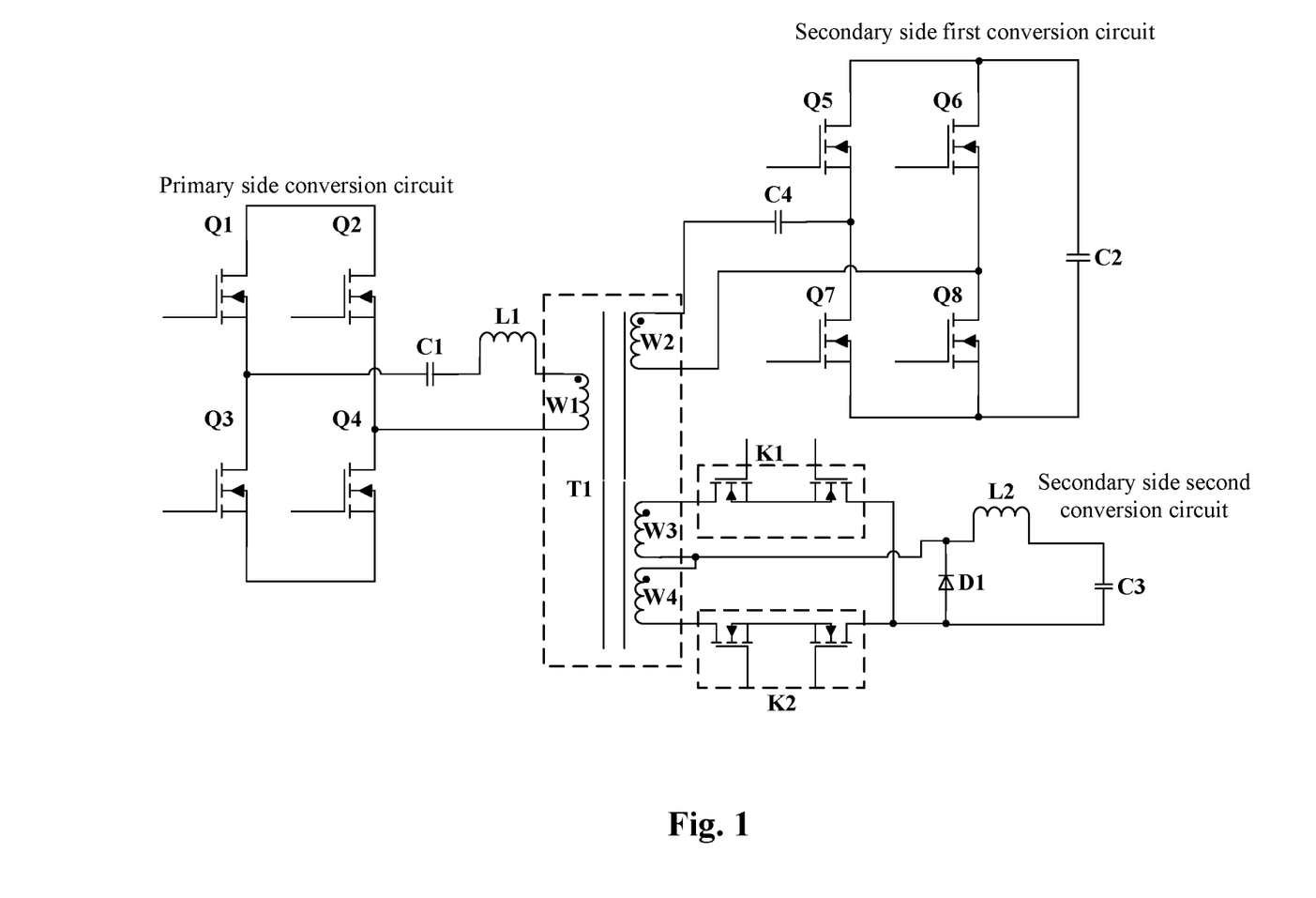
FIG. 1 is a circuit diagram of the first embodiment.

The present invention discloses a three-port charger with an inversion function, as shown in FIG. 1, which includes a primary side conversion circuit connected with a primary side winding W1 of a transformer, a secondary side first conversion circuit connected with a second winding W2 of the transformer, a secondary side second conversion circuit connected with a third winding W3 of the transformer and a fourth winding W4 of the transformer which are connected in series, and a central control unit used for controlling switches in the primary side conversion circuit, the secondary side first conversion circuit and the secondary side second conversion circuit, wherein the primary side conversion circuit is connected with an external power supply and can be connected with a power factor correcting circuit at a high voltage. The secondary side first conversion circuit is connected with a high-voltage battery, and a voltage of the circuit is higher to facilitate storage of more electric energy. The secondary side second conversion circuit is connected with a low-voltage load and can be connected with a low-voltage battery, and a rated voltage of the load is low, so that a voltage of the secondary side second conversion circuit is lower.

The present invention can be widely used in an on-board charger and can integrate an independent on-board charger and a high-power DCDC module, the external power supply may be commercial power, the high-voltage battery may be a storage battery, and the low-voltage load may be various loads in a vehicle.

The central control unit is provided with a charging mode, a self-powered mode and an inversion mode.

In the charging mode, the central control unit controls an on-off frequency of the switch in the primary side conversion circuit and adjusts a voltage of the primary side winding W1 of the transformer, controls the switch in the secondary side first conversion circuit to work in a rectification mode and charge the high-voltage battery, and controls the switch in the secondary side second conversion circuit to work in a chopping mode, adjust constant voltage output of the secondary side second conversion circuit and supply power to the low-voltage load. In the mode, the external power supply charges the high-voltage battery and supplies power to the low-voltage load. When the switch in the secondary side second conversion circuit is controlled to work in the chopping mode, the switch in the secondary side second conversion circuit and the switch in the primary side conversion circuit shall maintain a certain time sequence requirement to ensure forward current flow of the switch in the secondary side second conversion circuit, so that PWM control stabilizes the voltage and the secondary side second conversion circuit provides a direct current with an appropriate voltage amplitude to the low-voltage load.

In the self-powered mode, the central control unit controls the switch in the primary side conversion circuit to be turned off, controls an on-off duty ratio of the switch in the secondary side first conversion circuit and adjusts a voltage of the second winding W2 of the transformer, and controls the switch in the secondary side second conversion circuit to work in a rectification mode and supply power to the low-voltage load. At this time, the primary side conversion circuit does not participate in the work, and the high-voltage battery supplies power to the low-voltage load. The self-powered mode is also called a DC-DC mode. In the related art, a charging circuit and a DC-DC circuit are relatively independent circuits, and in the present application, the charging circuit and the DC-DC circuit are integrated, so that a volume is reduced, and costs are reduced.

In the inversion mode, the central control unit controls an on-off frequency of the switch in the secondary side first conversion circuit and inverts a direct current of the high-voltage battery into an alternating current, controls the switch in the primary side conversion circuit to work in a rectification mode and feed power back to the external power supply, and controls the switch in the secondary side second conversion circuit to work in a chopping mode, adjust constant voltage output of the secondary side second conversion circuit and supply power to the low-voltage load. In some special places, especially in the wild, when other vehicles or electrical appliances need to be supplied with electricity by the vehicle, the vehicle's storage battery can supply electricity to the outside through the inversion mode, and supply electricity to all loads of the vehicle at the same time.

With reference to the embodiments shown in FIGS. 1, 4, 5 and 6, the primary side conversion circuit includes first to fourth switches Q1 to Q4, a first capacitor C1 and a first inductor L1, the first and third switches Q1 and Q3 are sequentially connected in series through source and drain electrodes and then connected with the external power supply, the second and fourth switches Q2 and Q4 are sequentially connected in series through source and drain electrodes and then connected with the external power supply, and the first capacitor, the first inductor and the primary side winding W1 of the transformer are connected in series between a connecting line of the first and third switches Q1 and Q3 and a connecting line of the second and fourth switches; and gate electrodes of the first to fourth switches are respectively connected with the central control unit. After being processed by the power factor correcting circuit, the external power supply is transmitted to a transformer T1 through the primary side conversion circuit, then electric energy is transmitted to the secondary side first conversion circuit and the secondary side second conversion circuit, and frequencies of the first to fourth switches Q1 to Q4 are adjusted, so that output voltages of the secondary side first conversion circuit and the secondary side second conversion circuit can be adjusted correspondingly. The first inductor in the drawing may be a discrete component, may also be integrated in the transformer T1, and may further be a leakage inductance of the T1. In the charging mode, the switch in the primary side conversion circuit, the first capacitor, the first inductor and the primary side winding of the transformer form a resonant working topology, which can effectively reduce a loss and improve an efficiency of transmitting the electric energy to a secondary side of the transformer. In the inversion mode, the first to fourth switches Q1 to Q4 are controlled in the rectification mode.

With reference to the first embodiment shown in FIG. 1, the secondary side first conversion circuit includes fifth to eighth switches Q5 to Q8, a fourth capacitor C4 and a second capacitor C2, the fifth and seventh switches Q5 and Q7 are sequentially connected in series through source and drain electrodes and then connected with two ends of the second capacitor, the sixth and eighth switches Q6 and Q8 are sequentially connected in series through source and drain electrodes and then connected with the two ends of the second capacitor, the two ends of the second capacitor are connected with the high-voltage battery, and the second capacitor plays a role of a filter capacitor here. The fourth capacitor and the second winding W2 of the transformer are connected in series between a connecting line of the fifth and seventh switches and a connecting line of the sixth and eighth switches (the fourth capacitor plays a role of a resonant capacitor here); and gate electrodes of the fifth to eighth switches are respectively connected with the central control unit. In the charging mode, the fifth to eighth switches Q5 to Q8 are controlled in the rectification mode. In the inversion mode, the fifth to eighth switches Q5 to Q8 are controlled in the inversion mode. In a topological structure formed by the secondary side first conversion circuit, a voltage borne by the switch is only 1 time of an output voltage of the conversion circuit, and device costs are greatly reduced.

Figure 4:
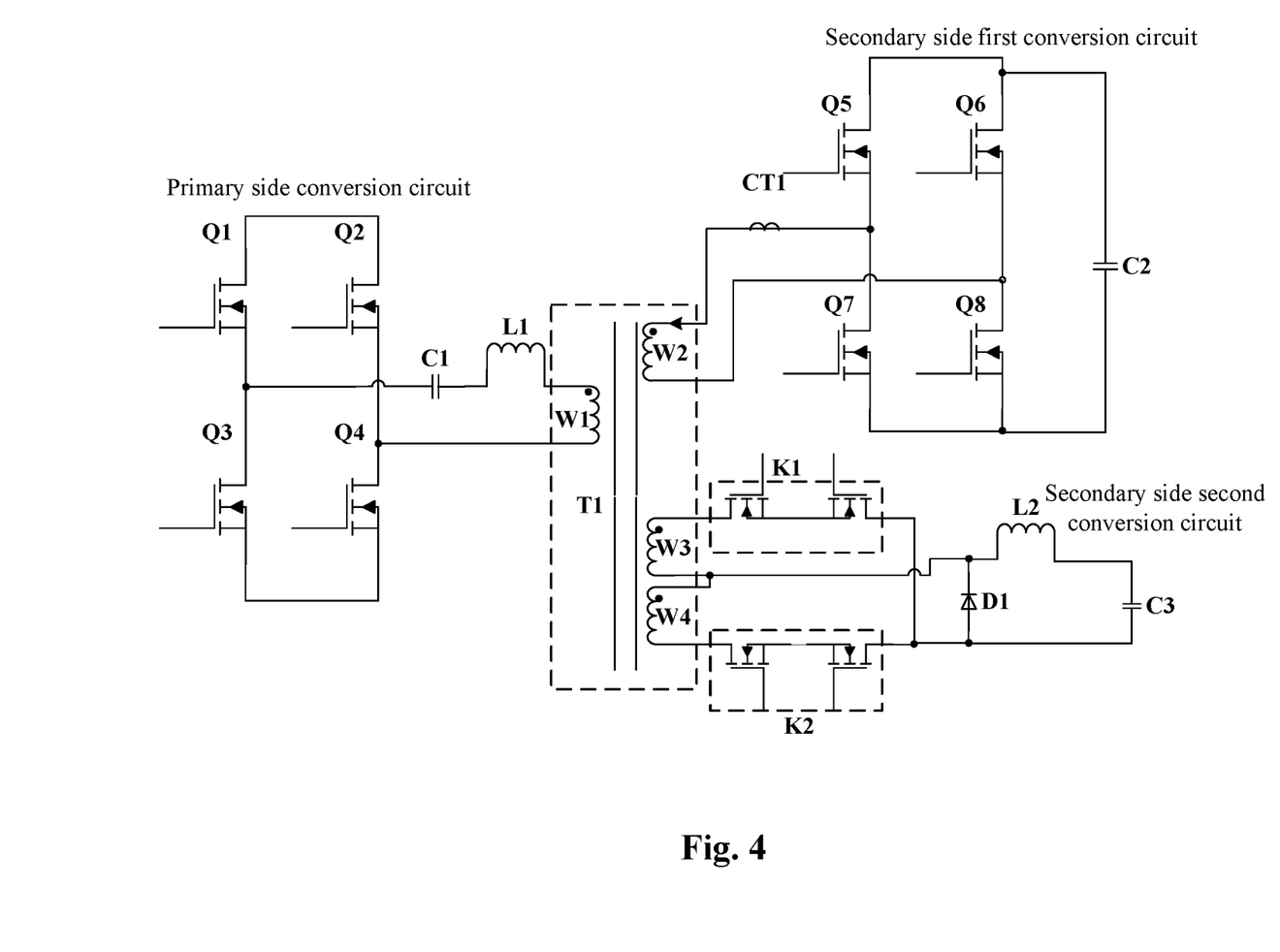
FIG. 4 is a circuit diagram of the second embodiment.

With reference to the second embodiment shown in FIG. 4, the secondary side first conversion circuit includes fifth to eighth switches Q5 to Q8, a current transformer CT1 and a second capacitor C2, the fifth and seventh switches Q5 and Q7 are sequentially connected in series through source and drain electrodes and then connected with two ends of the second capacitor, the sixth and eighth switches Q6 and Q8 are sequentially connected in series through source and drain electrodes and then connected with the two ends of the second capacitor, the two ends of the second capacitor are connected with the high-voltage battery, and the current transformer and the second winding W2 of the transformer are connected in series between a connecting line of the fifth and seventh switches and a connecting line of the sixth and eighth switches; and gate electrodes of the fifth to eighth switches are respectively connected with the central control unit. Compared with the first embodiment, the current transformer CT1 used in the embodiment replaces the fourth capacitor C4, which can prevent a problem of magnetic bias saturation.

With reference to the first embodiment shown in FIG. 1, the secondary side second conversion circuit includes first and second bidirectional switches K1 and K2, a fly-wheel diode D1, a second inductor L2 and a third capacitor C3, one end of the first bidirectional switch is connected with a dotted terminal of the third winding W3 of the transformer and the other end of the first bidirectional switch is connected with an anode of the fly-wheel diode D1 and one end of the third capacitor, one end of the second bidirectional switch is connected with an undotted end of the fourth winding W4 of the transformer and the other end of the second bidirectional switch is connected with the anode of the fly-wheel diode D1, an undotted end of the third winding of the transformer is connected with a dotted end of the fourth winding of the transformer and is connected with a cathode of the fly-wheel diode and one end of the second inductor, the other end of the second inductor is connected with the other end of the third capacitor, two ends of the third capacitor are connected with the low-voltage load, and the first and second bidirectional switches are controlled by the central control unit. In the charging mode, the first and second bidirectional switches are controlled to work in the chopping mode to supply power to the low-voltage load. In the self-powered mode, the first and second bidirectional switches are controlled to work in the rectification mode to supply power to the low-voltage load. In the inversion mode, the first and second bidirectional switches are controlled to work in the chopping mode to supply power to the low-voltage load. It shall be pointed out that K1 and K2 are bidirectional switches in the embodiment, and in the case that the low-voltage load contains a battery, the central control unit can control K1 and K2 to invert a direct current of the battery in the load into an alternating current, and feed power back to the outside through the transformer T1 and the primary side conversion circuit. It shall be pointed out that the fly-wheel diode D1 may be an active control device such as MOSFET. K1 and K2 may be formed by the following devices: 1. Mosfet with Source electrodes together; 2. a GAN-type device; 3. a SIC-type device; and 4. an IGBT-type device and other active control devices.

Figure 2:
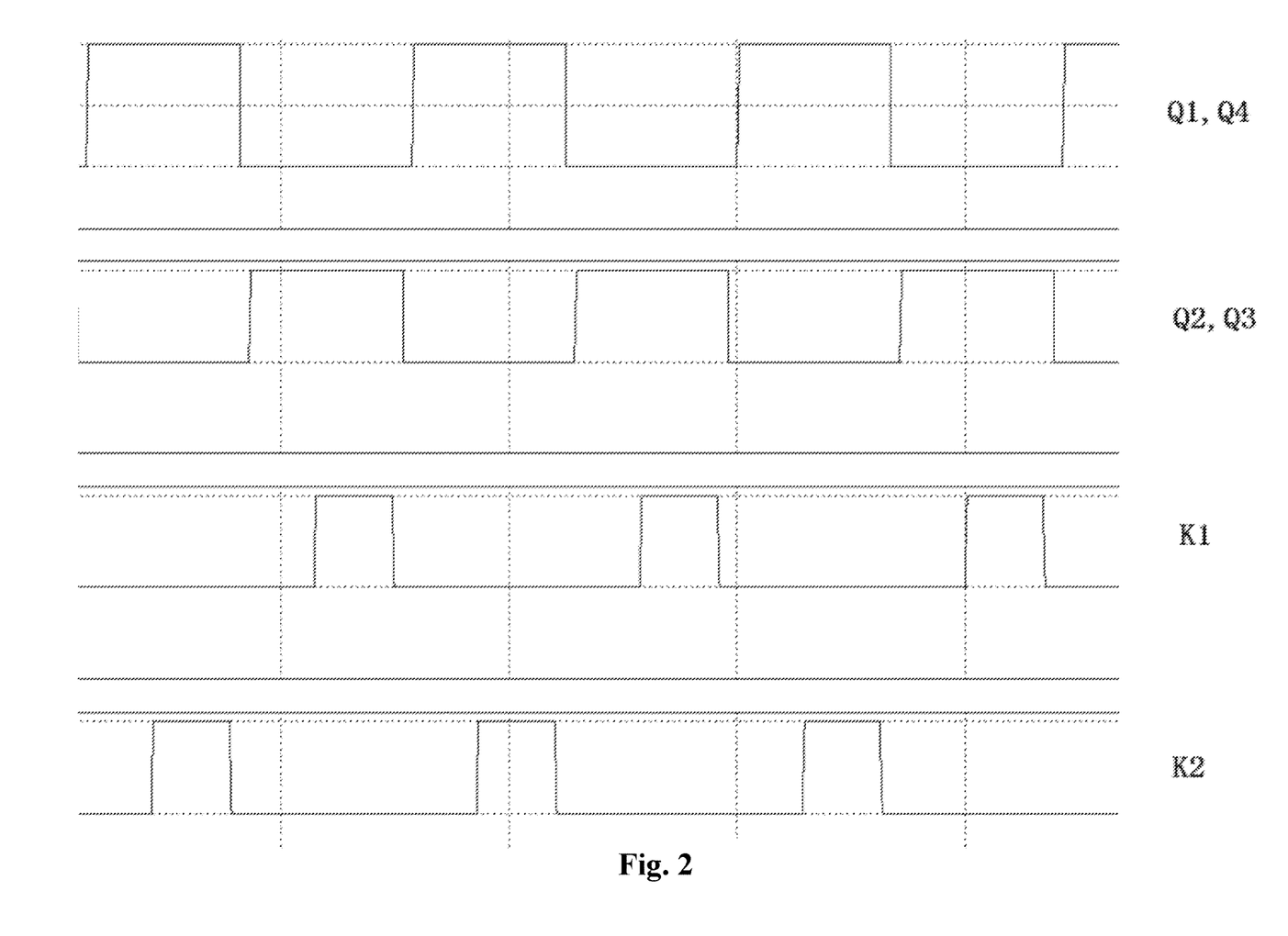
FIG. 2 is an oscillogram of all switches in a charging mode.

With reference to an oscillogram of all switches in a charging mode shown in FIG. 2, on-off actions of the first and fourth switches Q1 and Q4 are synchronized, on-off actions of the second and third switches Q2 and Q3 are synchronized and the second and third switches are alternately turned on and off with the first and fourth switches, the second bidirectional switch is turned on at a right time during a turn-on period of the first and fourth switches and the first bidirectional switch is turned off (a turn-on period of the second bidirectional switch may be as long as the turn-on period of the first and fourth switches or shorter than the turn-on period of the first and fourth switches, and the turn-on period is controlled by the central control unit), and the first bidirectional switch is turned on at a right time during a turn-on period of the second and third switches and the second bidirectional switch is turned off (a turn-on period of the first bidirectional switch may be as long as the turn-on period of the second and third switches or shorter than the turn-on period of the second and third switches, and the turn-on period is controlled by the central control unit).

Figure 3:
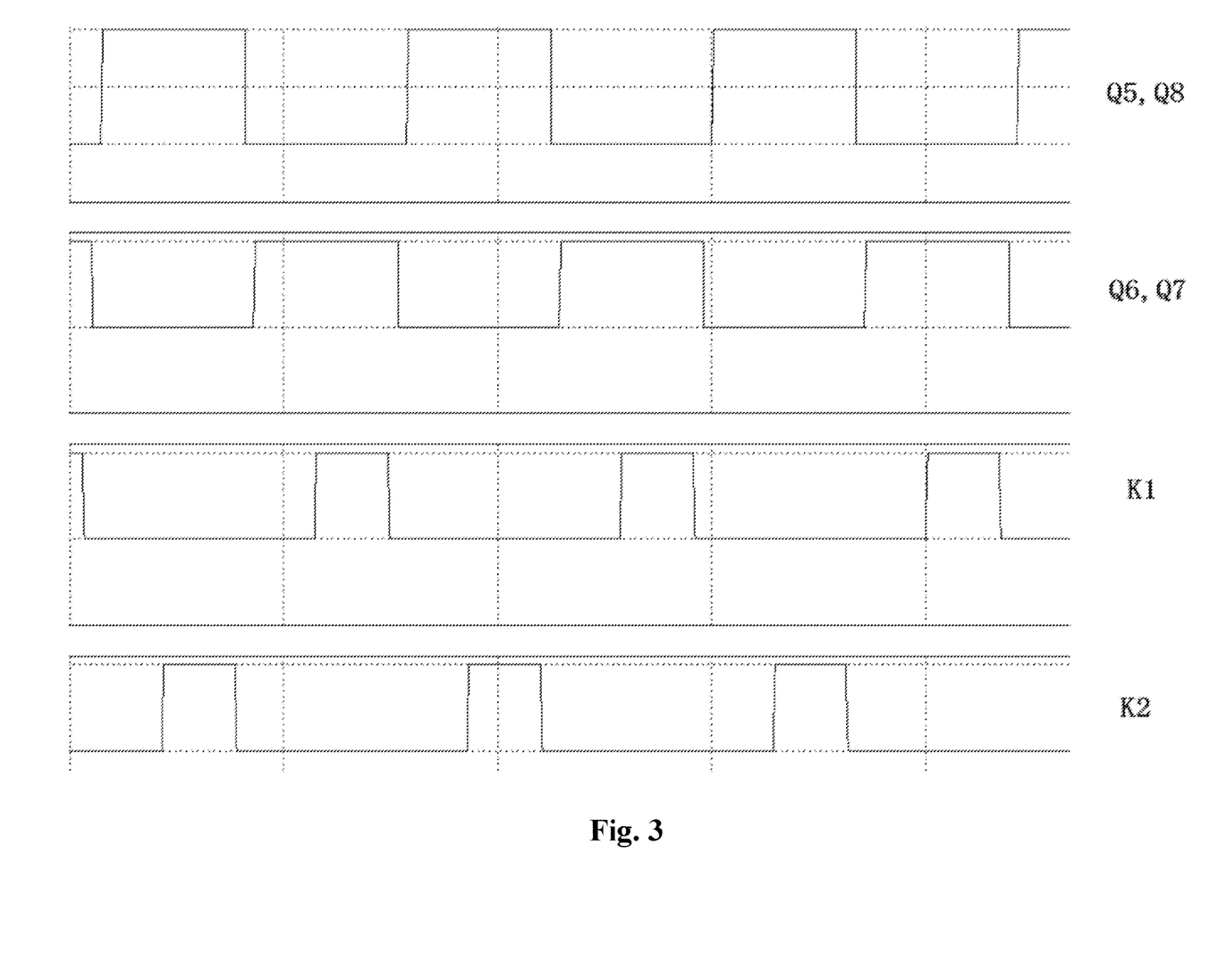
FIG. 3 is an oscillogram of all switches in a self-powered mode.

With reference to an oscillogram of all switches in a self-powered mode shown in FIG. 3, on-off actions of the fifth and eighth switches Q5 and Q8 are synchronized, on-off actions of the sixth and seventh switches Q6 and Q7 are synchronized and the sixth and seventh switches are alternately turned on and off with the fifth and eighth switches, the second bidirectional switch is turned on at a right time during a turn-on period of the fifth and eighth switches and the first bidirectional switch is turned off, and the first bidirectional switch is turned on at a right time during a turn-on period of the sixth and seventh switches and the second bidirectional switch is turned off.

Figure 5:
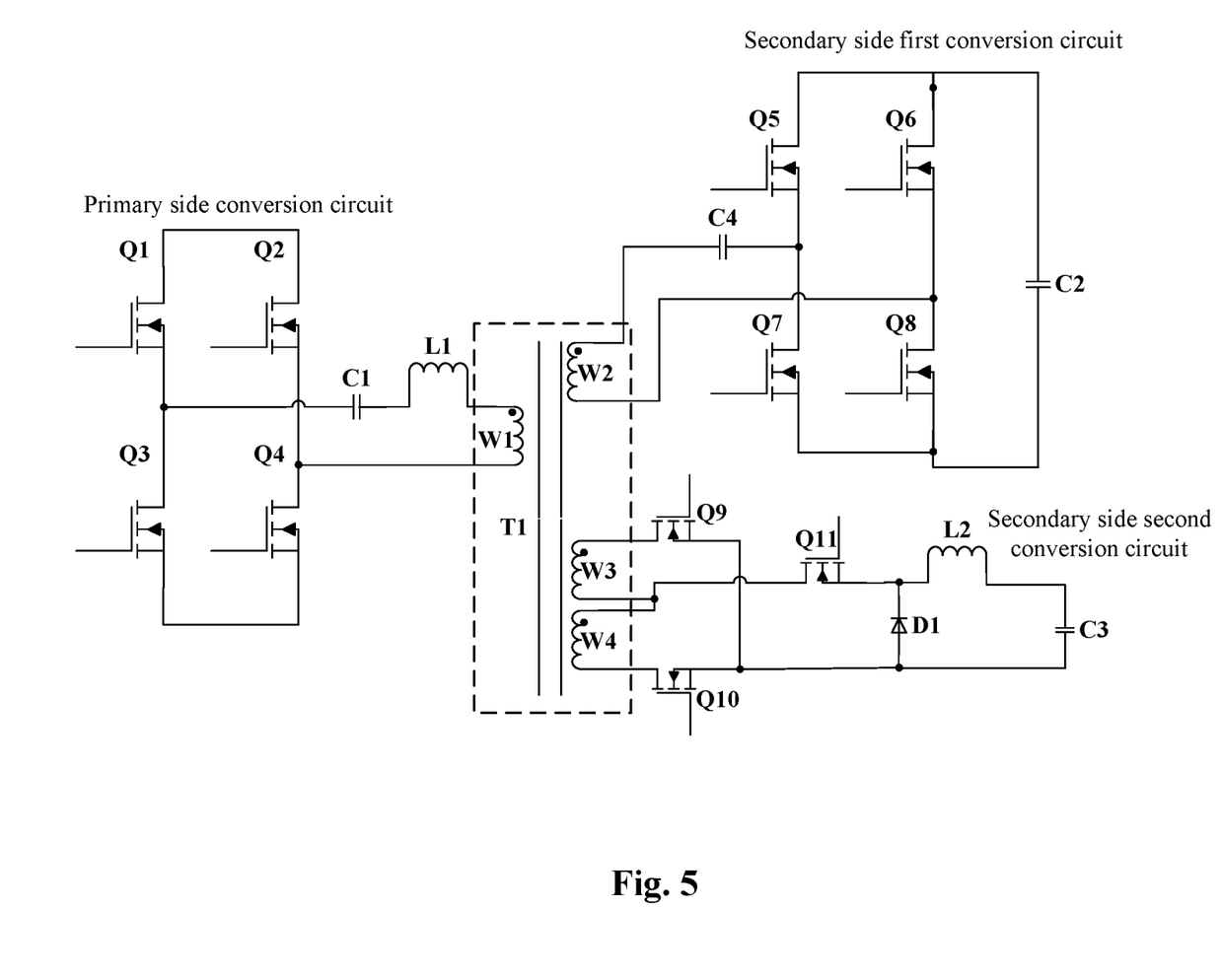
FIG. 5 is a circuit diagram of the third embodiment.

With reference to the third embodiment shown in FIG. 5, the secondary side second conversion circuit includes ninth to eleventh switches Q9 to Q11, a fly-wheel diode D1, a second inductor L2 and a third capacitor C3, one end of the ninth switch Q9 is connected with a dotted terminal of the third winding W3 of the transformer and the other end of the ninth switch is connected with an anode of the fly-wheel diode D1 and one end of the third capacitor, one end of the tenth switch Q10 is connected with an undotted end of the fourth winding W4 of the transformer and the other end of the tenth switch is connected with the anode of the fly-wheel diode (D1), an undotted end of the third winding of the transformer is connected with a dotted end of the fourth winding of the transformer and is connected with one end of the eleventh switch Q11, one end of the eleventh switch is connected with a cathode of the fly-wheel diode and one end of the second inductor, the other end of the second inductor is connected with the other end of the third capacitor, two ends of the third capacitor are connected with the low-voltage load, and the ninth to eleventh switches are controlled by the central control unit. Q9 and Q10 may act as synchronous rectifier tubes, while Q11 controls a secondary side second conversion voltage. When used in the charging mode, a working time sequence of Q11 is consistent with those of Q1 to Q4, but a duty ratio is controlled by the central control unit. When used in the self-powered mode or the inversion mode, the working time sequence of Q11 is consistent with those of Q5 to Q8, but a duty ratio is controlled by the central control unit.

Figure 6:
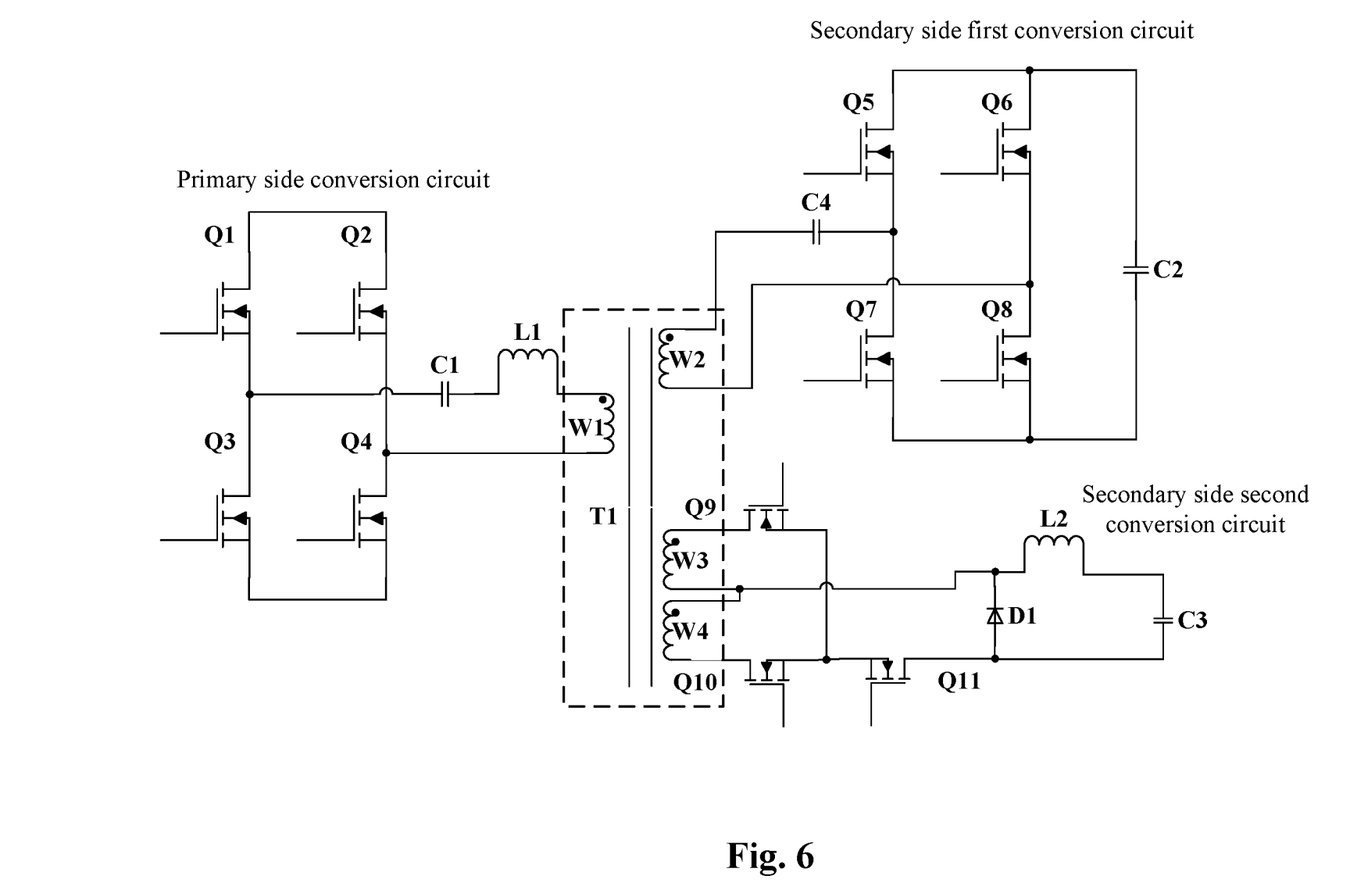
FIG. 6 is a circuit diagram of the fourth embodiment.

With reference to the fourth embodiment shown in FIG. 6, the secondary side second conversion circuit includes ninth to eleventh switches Q9 to Q11, a fly-wheel diode D1, a second inductor L2 and a third capacitor C3, one end of the ninth switch Q9 is connected with a dotted terminal of the third winding W3 of the transformer and the other end of the ninth switch is connected with one ends of the tenth switch Q10 and the eleventh switch Q11, the other end of the tenth switch Q10 is connected with an undotted end of the fourth winding W4 of the transformer, the other end of the eleventh switch is connected with the anode of the fly-wheel diode D1 and one end of the third capacitor, an undotted end of the third winding of the transformer is connected with a dotted end of the fourth winding of the transformer and is connected with a cathode of the fly-wheel diode and one end of the second inductor, the other end of the second inductor is connected with the other end of the third capacitor, two ends of the third capacitor are connected with the low-voltage load, and the ninth to eleventh switches are controlled by the central control unit. Q9 and Q10 may act as synchronous rectifier tubes, while Q11 controls a secondary side second conversion voltage. When used in the charging mode, a working time sequence of Q11 is consistent with those of Q1 to Q4, but a duty ratio is controlled by the central control unit. When used in the self-powered mode or the inversion mode, the working time sequence of Q11 is consistent with those of Q5 to Q8, but a duty ratio is controlled by the central control unit.

The embodiments above are used for illustration only and are not used for limitation. Any equivalent modification or change without departing from the concept of the present application should be included in the scope of the claims of the present application.

What is claimed is:

1. A three-port charger with an inversion function, comprising:
a primary side conversion circuit connected with a primary side winding (W1) of a transformer, a secondary side first conversion circuit connected with a second winding (W2) of the transformer, a secondary side second conversion circuit connected with a third winding (W3) of the transformer and a fourth winding (W4) of the transformer which are connected in series, and a central control unit used for controlling switches in the primary side conversion circuit, the secondary side first conversion circuit and the secondary side second conversion circuit, wherein
the primary side conversion circuit is connected with an external power supply, the secondary side first conversion circuit is connected with a high-voltage battery, and the secondary side second conversion circuit is connected with a low-voltage load;
the central control unit is provided with a charging mode, a self-powered mode and an inversion mode;
in the charging mode, an on-off frequency of the switch in the primary side conversion circuit is controlled and a voltage of the primary side winding (W1) of the transformer is adjusted, the switch in the secondary side first conversion circuit is controlled to work in a rectification mode and charge the high-voltage battery, and the switch in the secondary side second conversion circuit is controlled to work in a chopping mode, adjust constant voltage output of the secondary side second conversion circuit and supply power to the low-voltage load;
in the self-powered mode, the switch in the primary side conversion circuit is controlled to be turned off, an on-off duty ratio of the switch in the secondary side first conversion circuit is controlled and a voltage of the second winding (W2) of the transformer is adjusted, and the switch in the secondary side second conversion circuit is controlled to work in a rectification mode and supply power to the low-voltage load; and
in the inversion mode, an on-off frequency of the switch in the secondary side first conversion circuit is controlled and a direct current of the high-voltage battery is inverted into an alternating current, the switch in the primary side conversion circuit is controlled to work in a rectification mode and feed power back to the external power supply, and the switch in the secondary side second conversion circuit is controlled to work in a chopping mode, adjust constant voltage output of the secondary side second conversion circuit and supply power to the low-voltage load.

2. The three-port charger with the inversion function according to claim 1, wherein the primary side conversion circuit comprises first to fourth switches (Q1 to Q4), a first capacitor (C1) and a first inductor (L1), the first and third switches (Q1 and Q3) are sequentially connected in series through source and drain electrodes and then connected with the external power supply, the second and fourth switches (Q2 and Q4) are sequentially connected in series through source and drain electrodes and then connected with the external power supply, and the first capacitor, the first inductor and the primary side winding (W1) of the transformer are connected in series between a connecting line of the first and third switches (Q1 and Q3) and a connecting line of the second and fourth switches; and gate electrodes of the first to fourth switches are respectively connected with the central control unit.

3. The three-port charger with the inversion function according to claim 2, wherein the secondary side first conversion circuit comprises fifth to eighth switches (Q5 to Q8), a fourth capacitor (C4) and a second capacitor (C2), the fifth and seventh switches (Q5 and Q7) are sequentially connected in series through source and drain electrodes and then connected with two ends of the second capacitor, the sixth and eighth switches (Q6 and Q8) are sequentially connected in series through source and drain electrodes and then connected with the two ends of the second capacitor, the two ends of the second capacitor are connected with the high-voltage battery, and the fourth capacitor and the second winding (W2) of the transformer are connected in series between a connecting line of the fifth and seventh switches and a connecting line of the sixth and eighth switches; and gate electrodes of the fifth to eighth switches are respectively connected with the central control unit.

4. The three-port charger with the inversion function according to claim 2, wherein the secondary side first conversion circuit comprises fifth to eighth switches (Q5 to Q8), a current transformer (CT1) and a second capacitor (C2), the fifth and seventh switches (Q5 and Q7) are sequentially connected in series through source and drain electrodes and then connected with two ends of the second capacitor, the sixth and eighth switches (Q6 and Q8) are sequentially connected in series through source and drain electrodes and then connected with the two ends of the second capacitor, the two ends of the second capacitor are connected with the high-voltage battery, and the current transformer and the second winding (W2) of the transformer are connected in series between a connecting line of the fifth and seventh switches and a connecting line of the sixth and eighth switches; and gate electrodes of the fifth to eighth switches are respectively connected with the central control unit.

5. The three-port charger with the inversion function according to claim 3, wherein the secondary side second conversion circuit comprises first and second bidirectional switches (K1 and K2), a fly-wheel diode (D1), a second inductor (L2) and a third capacitor (C3), one end of the first bidirectional switch is connected with a dotted terminal of the third winding (W3) of the transformer and the other end of the first bidirectional switch is connected with an anode of the fly-wheel diode (D1) and one end of the third capacitor, one end of the second bidirectional switch is connected with an undotted end of the fourth winding (W4) of the transformer and the other end of the second bidirectional switch is connected with the anode of the fly-wheel diode (D1), an undotted end of the third winding of the transformer is connected with a dotted end of the fourth winding of the transformer and is connected with a cathode of the fly-wheel diode and one end of the second inductor, the other end of the second inductor is connected with the other end of the third capacitor, two ends of the third capacitor are connected with the low-voltage load, and the first and second bidirectional switches are controlled by the central control unit.

6. The three-port charger with the inversion function according to claim 5, wherein in the charging mode, on-off actions of the first and fourth switches (Q1 and Q4) are synchronized, on-off actions of the second and third switches (Q2 and Q3) are synchronized and the second and third switches are alternately turned on and off with the first and fourth switches, the second bidirectional switch is turned on at a right time during a turn-on period of the first and fourth switches and the first bidirectional switch is turned off, and the first bidirectional switch is turned on at a right time during a turn-on period of the second and third switches and the second bidirectional switch is turned off.

7. The three-port charger with the inversion function according to claim 5, wherein in the self-powered mode, on-off actions of the fifth and eighth switches (Q5 and Q8) are synchronized, on-off actions of the sixth and seventh switches (Q6 and Q7) are synchronized and the sixth and seventh switches are alternately turned on and off with the fifth and eighth switches, the second bidirectional switch is turned on at a right time during a turn-on period of the fifth and eighth switches and the first bidirectional switch is turned off, and the first bidirectional switch is turned on at a right time during a turn-on period of the sixth and seventh switches and the second bidirectional switch is turned off.

8. The three-port charger with the inversion function according to claim 3, wherein the secondary side second conversion circuit comprises ninth to eleventh switches (Q9 to Q11), a fly-wheel diode (D1), a second inductor (L2) and a third capacitor (C3), one end of the ninth switch (Q9) is connected with a dotted terminal of the third winding (W3) of the transformer and the other end of the ninth switch is connected with an anode of the fly-wheel diode (D1) and one end of the third capacitor, one end of the tenth switch (Q10) is connected with an undotted end of the fourth winding (W4) of the transformer and the other end of the tenth switch is connected with the anode of the fly-wheel diode (D1), an undotted end of the third winding of the transformer is connected with a dotted end of the fourth winding of the transformer and is connected with one end of the eleventh switch (Q11), one end of the eleventh switch is connected with a cathode of the fly-wheel diode and one end of the second inductor, the other end of the second inductor is connected with the other end of the third capacitor, two ends of the third capacitor are connected with the low-voltage load, and the ninth to eleventh switches are controlled by the central control unit.

9. The three-port charger with the inversion function according to claim 3, wherein the secondary side second conversion circuit comprises ninth to eleventh switches (Q9 to Q11), a fly-wheel diode (D1), a second inductor (L2) and a third capacitor (C3), one end of the ninth switch (Q9) is connected with a dotted terminal of the third winding (W3) of the transformer and the other end of the ninth switch is connected with one ends of the tenth switch (Q10) and the eleventh switch (Q11), the other end of the tenth switch (Q10) is connected with an undotted end of the fourth winding (W4) of the transformer, the other end of the eleventh switch is connected with the anode of the fly-wheel diode (D1) and one end of the third capacitor, an undotted end of the third winding of the transformer is connected with a dotted end of the fourth winding of the transformer and is connected with a cathode of the fly-wheel diode and one end of the second inductor, the other end of the second inductor is connected with the other end of the third capacitor, two ends of the third capacitor are connected with the low-voltage load, and the ninth to eleventh switches are controlled by the central control unit.

* * * * *